United States Patent Office 2,905,350
Patented Sept. 22, 1959

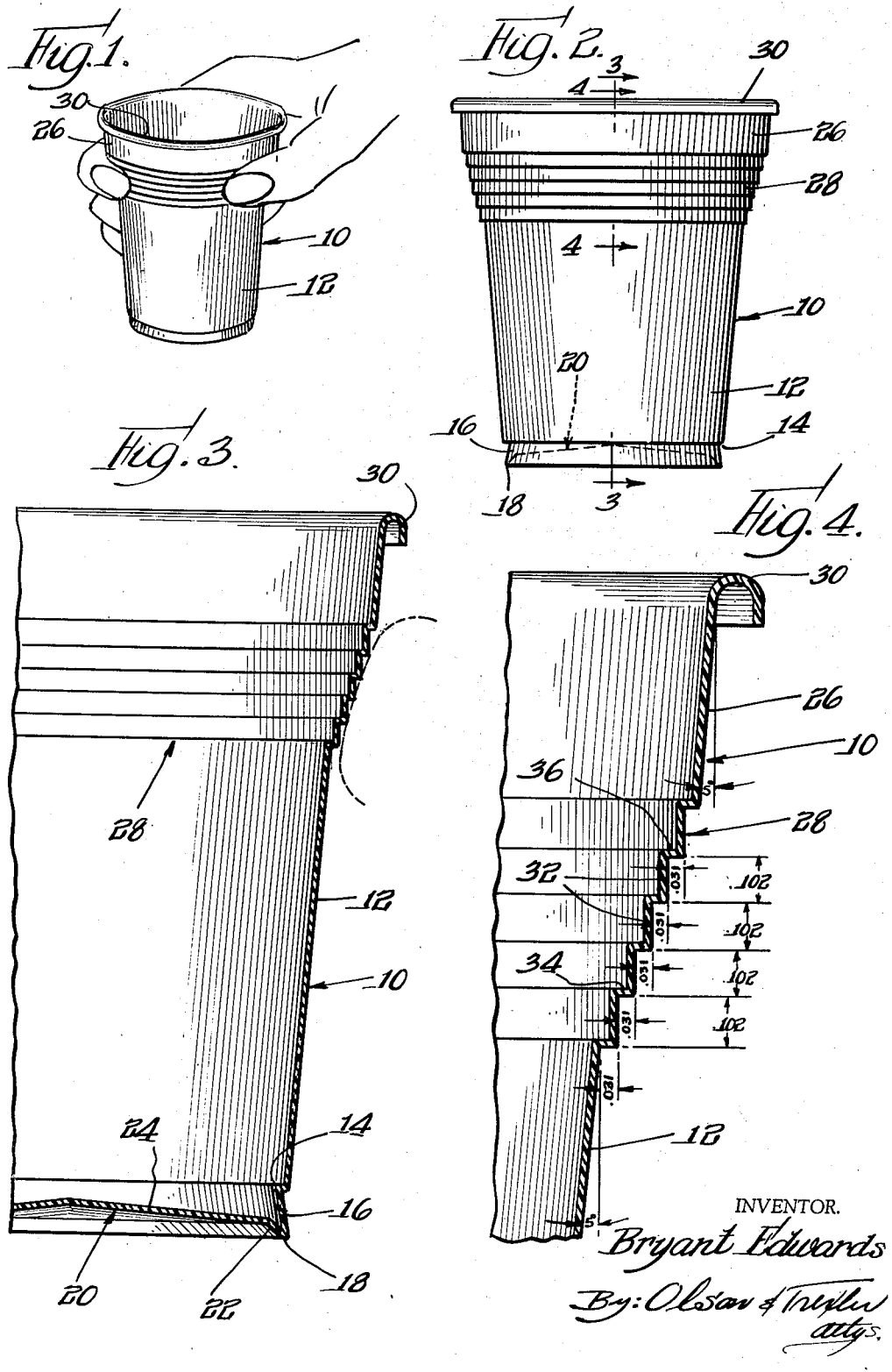

2,905,350
CUP FOR HOT BEVERAGES

Bryant Edwards, Chicago, Ill., assignor to Illinois Tool Works, Chicago, Ill., a corporation of Illinois Application November 29, 1957, Serial No. 699,679

2 Claims. (Cl. 215—1)

This invention is concerned generally with the art of drinking cups and the like, and more particularly with such cups of the expendable or throw-away variety.

It is well known that there are numerous throw-away or expendable cups now available on the market. Such cups are widely used for picnics and the like, and for dispensing various beverages from vending machines. Such cups often are made of paper which is coated with wax, or suitably impregnated and sometimes are made of plastic.

Due to space requirements in storage, particularly in coin-operated vending machines, it is common practice to nest or stack a series of cups telescopically within one another. To use the cups, particularly in vending machines, the end cup, usually the bottom one, is removed from the stack. Problems involving the removal of the end cup in a satisfactory manner are solved in accordance with the cup as herein disclosed, and as discussed and claimed in my copending application, Nestable Cup, filed November 29, 1957, Serial Number 699,678, now abandoned but refiled as a continuation-in-part, Serial Number 769,057, filed October 29, 1958.

The cup forming the subject matter of this invention is a thin-walled cup molded or formed of plastic material. Plastic cups have many advantages over paper cups, including a more favorable "touch" to the lips of the user, the absence of any sogginess which often develops during the use of paper cups, and the total impermeability to moisture vapor which generally results in condensation on a cool table beneath a paper cup filled with a hot beverage such as coffee. Unfortunately, thin-walled plastic cups possess certain inherent disadvantages. The side walls of the cups, and also the bottoms, are unduly flexible. As a result, the user's fingers tend to crush in the side walls, and the bottom tends to belly out or "oil can" under the weight of the liquid therein. Furthermore, heat transfer through the side walls of such cups generally makes it impossible for a person to hold such a cup full of hot coffee for more than the very shortest length of time without burning his fingers.

It is an object of this invention to provide a thin-walled plastic cup overcoming the difficulties noted above.

More particularly, it is an object of this invention to provide a thin-walled plastic cup having a configuration serving to rigidify the cup and further serving as a convenient finger grip.

Yet another object of this invention is to provide a thin-walled plastic cup having a configuration affording the least efficient transfer of heat from the contents of the cup to the user's fingers, whereby a cup of hot coffee may be held for an extended period without discomfort.

Other and further objects and advantages of the present invention will be apparent from the following description when taken in connection with the accompanying drawings wherein:

Fig. 1 is a perspective view of a cup constructed in accordance with the principles of this invention;

Fig. 2 is a side view thereof;

Fig. 3 is a longitudinal sectional view thereof taken substantially along the axis of the cup as indicated at 3—3 in Fig. 2; and Fig. 4 is an enlarged fragmentary view in axial section as taken substantially along the line 4—4 in Fig. 2.

Referring now in greater particularity to the drawings, there will be seen a generally frusto-conical cup 10. The cup includes an upwardly and outwardly tapering lower side wall 12 which preferably forms an angle of substantially 5° with the vertical, as indicated in Fig. 4. The bottom of the lower side wall 12 is provided with an inwardly directed offset or shoulder 14 joining a reverse or back tapered ring 16. The ring 16 is joined at the lower margin 18 to a bottom 20 integral therewith. The bottom includes a circumferential ring portion 22 oriented on the order of 45° with respect to the horizontal, and forming a sharp angle with the ring 16 at the lower margin 18. The remainder of the bottom 20 comprises a rather shallow conical section 24.

The conical configuration of the bottom is of considerable importance since it prevents the bottom from sagging or "oil canning" when the cup is full of liquid. The shelf or step or shoulder 14 is provided for stacking the cups, the lower margin 18 of one cup being received on the shoulder 14 of a cup nested therewith, as set forth in my aforesaid copending application. The sharp edge at the lower margin 18 is important in that it provides a thin-line contact with one or more fingers placed beneath the lower edge of the cup, as some people like to do in holding a cup. Accordingly, there is very inefficient heat transfer, and a person's fingers are not burned when so holding a cup of hot coffee or the like.

The lower side wall 12, which might be termed a lower body portion, is joined to an upper side wall or body portion 26 by an intermediate gripping ring section 28, shortly to be described in greater detail. The upper body or side wall 26 is preferably of the same taper as the lower body or side wall 12, but offset outwardly therefrom, and is terminated at its upper extremity by a rolled over lip 30.

Attention is now directed to the finger grip section 28. It will be seen that this section comprises a series of cylindrical rings 32, joined to one another and to the upper and lower side wall portions 26 and 12, respectively, by shelves or offsets 34. It has been found that a plurality of from three to ten such rings is a satisfactory number in view of all of the requisites. The rings serve a multiplicity of purposes. For one thing, they rigidify the side wall of the cup so that the side wall does not bend in or collapse under the pressure of a user's fingers. It will be appreciated that the reverse or back-tapered ring at the bottom of the cup similarly rigidifies the bottom of the cup. Furthermore, the gripping rings 28 serve as a convenient finger grip. The various offsets or steps insure a firm grip and, in addition, it will be observed that the included angle of the rings represents a steeper taper than the lower or bottom side wall 12. Accordingly, it is a simple matter for the fingers first to engage the lower side wall 12, and then to slide gently up along the lower side wall until they engage the gripping ring section 28. The increased angle of taper thereof causes this section to form a stop which the fingers engage and grip quite naturally.

In addition, the dimensions and number of the rings 32 and shelves 34 are so determined that the outer junctions thereof at 36 form a series of contact lines with the fingers so as to effect a minimum heat transfer from the cup to the fingers. Thus, although the wall of the cup is only on the order of 0.01 inch in thickness and is made of plastic, preferably high impact polystyrene, it is possible for one to hold the cup in the fingers without discomfort even when the cup is filled with hot coffee or the like. In the illustrative embodiment of the invention, as determined by calculation and experimentation, minimum heat transfer is effected by providing a plurality of rings, each offset on the order of $\frac{1}{32}$ inch (0.031 inch) and each having a height of 0.102 inch. As will be appreciated, the height varies somewhat in accordance with the finger of the user, and it has been found that for a small finger a height of 0.094 inch is best and for a large finger a height of 0.109 inch is best. The figure selected is a compromise which provides the least efficient heat transfer to a finger of medium size, and which is also quite satisfactory with larger or smaller fingers.

From the foregoing, it will be understood that the molded plastic cup herein disclosed, although being of inexpensive construction, is readily stacked for storage in a dispensing magazine or the like, and is adapted for holding in the fingers, even when filled with hot coffee or the like. The ridges or ribs provided by the circular rings and shelves of the gripping-ring section serve to rigidify the cup, to provide a convenient finger grip, and to allow the cup to be held without burning the fingers. Similarly, the configuration of the bottom of the cup prevents deformation thereof while coacting with the side wall, particularly the reverse taper ring thereof, to form a sharp corner at the bottom of the cup affording very inefficient heat transfer, whereby one or more fingers may be placed along this edge without discomfort.

The illustrative embodiment of the invention as heretofore shown and described is exemplary only. As will be understood, various changes in structure will no doubt occur to those skilled in the art, and are to be understood as forming a part of this invention insofar as they fall within the spirit and scope of the appended claims.

The invention is claimed as follows:

1. A thin-walled nestable plastic cup-like container comprising body and bottom portions, said body portion including a lower body wall section of substantially frusto-conical shape of predetermined upward and outward taper, and an upper body wall section, a band section connecting the upper and lower body wall sections and comprising a vertical series of relatively closely axially spaced outward peripherally disposed projections with super-positioned projections disposed radially outwardly of the center axis of the body portion an increasing increment and providing a serrated finger-gripping band portion diverging outwardly from the top of the lower body wall section to a greater degree than the predetermined taper of the said lower body wall section, the said finger-gripping band portion being of limited vertical extent relative to the over-all height of the cup, and said upper body wall section terminating in a radially projecting portion providing reinforcement around the top of the container.

2. A thin-walled nestable plastic cup-like container as claimed in claim 1, wherein the upper body wall section extends axially below the radially projecting portion around the top of the container in frusto-conical section above the finger-gripping band portion, and wherein the bottom portion presents a concavity extending upwardly into the container and providing a narrow peripheral supporting edge therearound.

References Cited in the file of this patent

UNITED STATES PATENTS

| | | |
|---|---|---|
| 2,088,181 | Swift | July 27, 1937 |
| 2,208,431 | Rochow | July 16, 1940 |
| 2,530,124 | Keickhefer | Nov. 14, 1950 |
| 2,717,619 | Whitman | Sept. 13, 1955 |
| 2,816,697 | Amberg | Dec. 17, 1957 |
| 2,842,301 | Albert | July 8, 1958 |